UNITED STATES PATENT OFFICE.

HEINRICH HOERLEIN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

ARYLALKYLBARBITURIC ACID.

1,025,526.  Specification of Letters Patent.  Patented May 7, 1912.

No Drawing.  Application filed September 6, 1911. Serial No. 647,903.

*To all whom it may concern:*

Be it known that I, HEINRICH HOERLEIN, doctor of philosophy, chemist, citizen of the German Empire, residing at Vohwinkel, near Elberfeld, Germany, have invented new and useful Improvements in Arylalkylbarbituric Acid, of which the following is a specification.

My invention relates to the manufacture and production of the hitherto unknown arylbarbituric acids having the formula:—

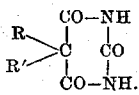

(R=H or alkyl, R'=aryl) which have proved to be hypnotics, an average dose being from ¼ to ½ gram. They are white crystals scarcely soluble in water forming soluble salts with alkalis. The process for their production consists in condensing aryl substituted malonic acid esters with urea in the presence of sodium alcoholate e. g.

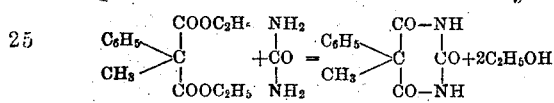

In order to illustrate the new process more fully the following example is given, the parts being by weight:—250 parts of phenyl-methyl-malonic acid ester (=1 mol.) are added to a solution of 69 parts of sodium (=3 mol.) in 1200 parts of absolute alcohol. 90 parts of urea (=1.5 mol.) are added thereto and the mixture is heated to boiling in a vessel provided with a reflux condenser during 6 hours. The sodium salt precipitates. It is filtered off and diluted in water. From this solution the free acid is precipitated by neutralization with hydrochloric acid.

My new substance crystallizes from water in the shape of white leaflets melting in 220° C. It possesses the property of forming salts with many metals e. g. the alkali metals, or the calcium, the hydrogen of the NH group being replaced by the metal. It may be either used in the acid or salt form. The sodium salt is a white crystalline powder easily soluble in water.

The phenylpropylbarbituric acid melts at 190° C., the para-methoxyphenylethylbarbituric acid melts at 202° C., the phenylbenzylbarbituric acid melts at 235° C., the phenylbarbituric acid melts at 250° C.

I claim:—

1. The herein described arylbarbituric acids, being white crystals scarcely soluble in water, forming soluble salts with alkalis; and being valuable hypnotics, substantially as described.

2. The herein described arylalkylbarbituric acids of the following general formula

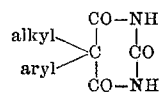

being white crystals scarcely soluble in water, forming soluble salts with alkalis; and being valuable hypnotics, substantially as described.

3. The herein described phenylalkylbarbituric acids of the following general formula:

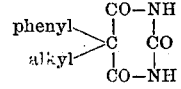

being white crystals scarcely soluble in water, forming soluble salts with alkalis; and being valuable hypnotics, substantially as described.

4. The herein described phenylmethyl-barbituric acid of the formula:

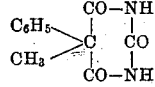

crystallizing from water in the shape of white leaflets melting at 220° C., forming salts with alkali metals and calcium; and being a valuable hypnotic, substantially as described.

In testimony whereof I have hereunto set my hand in the presence of two subscribing witnesses.

HEINRICH HOERLEIN. [L. S.]

Witnesses:
 L. NUFER,
 A. NUFER.